United States Patent
Ozaki et al.

[11] Patent Number: 5,755,509
[45] Date of Patent: May 26, 1998

[54] VEHICULAR LAMPS

[75] Inventors: Akiyoshi Ozaki; Masayasu Tominaga; Hitoshi Wada, all of Shizuoka, Japan

[73] Assignee: Koito Manufacturing Co., Ltd., Tokyo, Japan

[21] Appl. No.: 785,921

[22] Filed: Jan. 21, 1997

[30] Foreign Application Priority Data

Jan. 25, 1996 [JP] Japan ................ 8-031260

[51] Int. Cl.$^6$ .............. B60Q 1/00; B32B 15/08; F21K 7/00
[52] U.S. Cl. .............. 362/263; 362/61; 428/380
[58] Field of Search .............. 362/61, 263; 428/375, 428/378, 380, 386

[56] References Cited

U.S. PATENT DOCUMENTS

| | | | |
|---|---|---|---|
| 3,668,611 | 6/1972 | Schwartz | 439/376 |
| 4,678,709 | 7/1987 | Tondre et al. | 428/380 |
| 4,711,811 | 12/1987 | Randa | 428/383 |
| 5,107,405 | 4/1992 | Makita | 362/61 |
| 5,113,330 | 5/1992 | Makita | 362/265 |
| 5,118,990 | 6/1992 | Makita | 315/77 |
| 5,119,275 | 6/1992 | Makita | 362/61 |
| 5,173,062 | 12/1992 | Uchida | 439/617 |
| 5,188,444 | 2/1993 | Makita et al. | 362/80 |
| 5,228,776 | 7/1993 | Makita et al. | 362/61 |
| 5,238,741 | 8/1993 | Knights et al. | 428/366 |
| 5,343,370 | 8/1994 | Ohashi et al. | 362/61 |
| 5,358,786 | 10/1994 | Ishikawa et al. | 428/380 |
| 5,382,876 | 1/1995 | Sugasawa et al. | 315/82 |
| 5,389,422 | 2/1995 | Arroyo et al. | 428/396 |
| 5,462,803 | 10/1995 | Wessels | 428/380 |
| 5,470,657 | 11/1995 | Hayami | 428/373 |
| 5,521,009 | 5/1996 | Ishikawa et al. | 428/375 |
| 5,580,564 | 12/1996 | Cotter et al. | 428/375 |
| 5,639,549 | 6/1997 | Fukunaga et al. | 428/379 |
| 5,654,095 | 8/1997 | Yin et al. | 428/372 |

FOREIGN PATENT DOCUMENTS 56-118216  9/1981  Japan ................ 428/380

Primary Examiner—Ira S. Lazarus
Assistant Examiner—Ljiljana V. Ciric
Attorney, Agent, or Firm—Sughrue, Mion, Zinn, Macpeak & Seas, PLLC

[57] ABSTRACT

The characteristic of a connection cord for use in a discharge lamp, such as the heat resistance, assembling easiness and adhesion facility, are intended to be improved while preventing generation of harmful gas even if heated, the connection cord also having humidity resistance. The connection cord is coated with at least two layers such that an inner sheath is made of soft resin having humidity resistance and an outer sheath is made of a rubber composition containing tetrafluoroethylene-α-olefin copolymer as the main component.

10 Claims, 2 Drawing Sheets

VEHICULAR LAMPS

BACKGROUND OF THE INVENTION

1. Field of the Invention

The present invention relates generally to a vehicular lamp of a discharge type. More particularly, the invention relates to a vehicular lamp in which material of a sheath of a connection cord connecting to a discharge lamp is improved in heat resistance, adhesive properties, flexibility and humidity resistance, and a method of producing the sheath.

2. Related Art

A discharge lamp (for example, a metal halide lamp) serving as a light source for a vehicular lamp, attracts attention in recent years, employs a connection cord. The connection cord must have voltage resistance to endure high voltage generated due to a start pulse when the lamp is turned on, heat resistance to withstand high temperatures generated by the discharge lamp, softness (flexibility) permitting the operation for attaching the discharge lamp to the lamp unit to be performed easily and adhesive properties when allowed to adhere to another element. Moreover, generation of harmful gas must be prevented when the connection cord is heated considerably. In addition, the connection cord is required to have sufficient mechanical strength to prevent breakage of the sheath when the connection cord is brought into contact with another element.

The present inventors have proposed a connection cord made of a material capable of satisfying the above-mentioned characteristics, as disclosed in Unexamined Japanese Patent Publication No. Hei. 6-113420. The proposed connection cord has a sheath formed of a rubber composite material containing tetrafluoroethylene-α-olefin copolymer as the main component. The foregoing connection cord improves in heat resistance, assembling easiness and adhesive properties. Moreover, generation of harmful gas can be prevented even if the connection cord is heated considerably. In addition, shortening of the life of the discharge lamp attributable to adhesion of the harmful gas to the discharge lamp can be prevented.

However, the sheath of the connection cord mainly made of the tetrafluoroethylene-α-olefin copolymer has another problem in that it absorbs moisture if the connection cord is watered for a long time and therefore the voltage resistance deteriorates. If the discharge lamp is turned on (if high voltage is applied in the foregoing state), an undesirable hole may be formed in the sheath.

SUMMARY OF THE INVENTION

Accordingly, an object of the present invention is to provide a connection cord for a discharge lamp also having humidity resistance.

In order to achieve the foregoing object, according to one aspect of the present invention, there is provided a vehicular lamp including a discharge lamp and a connection cord for supplying discharge voltage to the discharge lamp, wherein the connection cord is coated with at least two sheath layers such that an inner sheath is made of soft resin having humidity resistance and an outer sheath is made of soft resin having heat resistance.

As described above, since the structure of the invention is arranged such that the outer sheath is made of the soft resin having heat resistance, the connection cord is not denatured even if it is heated up to 120° C. to 125° C. Moreover, generation of harmful gas, such as siloxane gas which adheres to the discharge lamp and shortens the life of the discharge lamp, can be prevented. In addition, the assembling operation and the adhesion operation can easily be performed. Since the inner sheath is made of the soft resin having humidity resistance, the inner sheath does not absorb moisture even if the connection cord is watered and thus the outer sheath has absorbed moisture. Therefore, an accident of forming a hole in the sheath of the connection cord can be prevented even if high voltage is applied to the connection cord.

Another aspect of the invention has a structure such that the outer sheath is made of a rubber composition containing tetrafluoroethylene-α-olefin copolymer as the main component. Since the structure of the connection cord is arranged such that the outer sheath is made of the rubber composition containing tetrafluoroethylene-α-olefin copolymer as the main component, an advantage can be realized in that generation of any harmful gas is prevented even if heated at high temperatures.

Another aspect of the invention has a structure such that the discharge lamp is disposed in a lamp chamber defined by a lens and a lamp body, and the connection cord is disposed in the lamp chamber. Therefore, the structure of this aspect of the invention permits the connection cord to be disposed in a portion, such as a lamp chamber in which the discharge lamp is disposed, which is heated, the connection cord is not denatured attributable to the high temperatures and generation of harmful gas can be prevented.

Still another aspect of the invention has a structure such that two connection cords are provided, and the connection cords are disposed in a space in the tube made of the soft resin having the heat resistance. Therefore, the structure of this aspect of the invention enables the two connection cords to be bundled. Thus, the operation for attaching the discharge lamp to the lamp unit can easily be performed. Moreover, when the two connection cords are bent, generation of stress in the connection cord can be prevented.

Still another aspect of the invention has a structure such that the tube is covered with a tube cover made of a conductive metal material. Therefore, the feature of this structure protects the tube from being damaged when the discharge lamp is attached to the lamp unit or when the tube is brought into contact with another element in the lamp unit. Moreover, leakage of noise generated from the connection cord can be prevented.

Other objects, features and advantages of the invention will be evident from the following detailed description of the preferred embodiments described in conjunction with the attached drawings.

DESCRIPTION OF THE PREFERRED EMBODIMENTS

Figure 1:
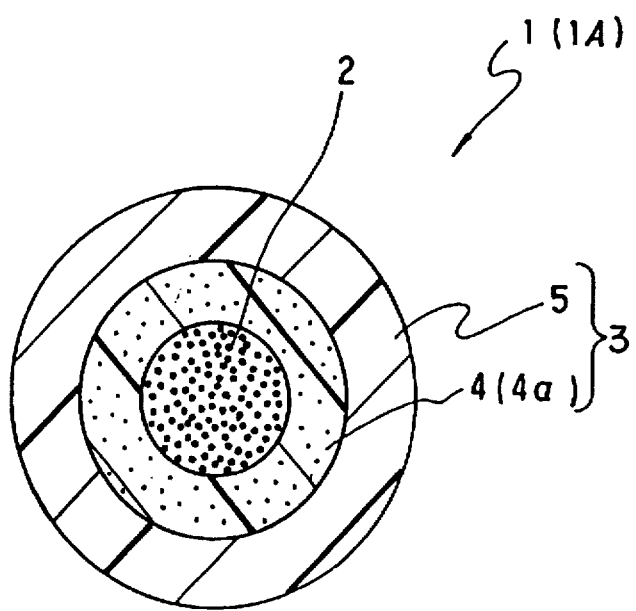
FIG. 1 is a cross sectional view showing a connection cord for use in a vehicular lamp according to first and second embodiments of the present invention.

FIG. 1 is a cross sectional view showing a connection cord for use in a lamp for a vehicle according to first and second embodiments of the present invention. Reference numerals shown in FIG. 1 which are not put in parentheses are reference numerals according to the first embodiment.

A connection cord 1 is provided with a sheath 3 constituted by two layers which is formed on a conductor (a twisted wire formed by collecting tin-plated soft copper wires) 2. An inner sheath 4 of the sheath 3 is made of soft resin manufactured by mixing a filler processed with, for example, a coupling agent with a rubber composition, the main component of which is tetrafluoroethylene-α-olefin copolymer. An outer sheath 5 is made of a rubber composition which contains, as the main component thereof, soft resin having heat resistance, the value of which measured by a method conforming to "Confirmation Test for Upper Limit of Temperatures of Insulating Materials for Use in Electric Products" in accordance with Electric Product Regulation Technology Standard is 130° C. or higher, for example, tetrafluoroethylene-α-olefin copolymer.

The rubber composition containing tetrafluoroethylene-α-olefin copolymer as the main component thereof for forming the outer sheath 5 is manufactured by a method disclosed in Unexamined Japanese Patent Publication No. Hei. 6-113420. The inner sheath 4 is manufactured by adding a filler serving as a reinforcing material to the rubber composition, the main component of which is the tetrafluoroethylene-α-olefin copolymer. Moreover, a material for enhancing degree of contact between the filler and the main rubber, for example, a known coupling agent is added to obtain humidity resistance. The coupling agent may be a silane material, an aluminum material, a zircoaluminum material, a titanate material available from the market.

The inner sheath 4 is formed such that the soft resin having humidity resistance and obtained by mixing the filler processed with the coupling agent with the rubber composition containing tetrafluoroethylene-α-olefin copolymer as the main component is extruded so that the conductor 2 is coated with the inner sheath 4 having a thickness of 1.0 mm. Immediately after this, the inner sheath 4 on the conductor 2 are brought into contact with steam, the pressure of which is 15 atmospheres, for 1 minute and 30 seconds. Similarly to the inner sheath 4, the outer sheath 5 is formed such that the rubber composition containing tetrafluoroethylene-α-olefin copolymer as the main component is extruded on to the material in process having the inner sheath 4 to have a thickness of 0.55 mm. Immediately after this, the thus-obtained material in process is brought into contact with steam, the pressure of which is 15 atmospheres, for 1 minute and 30 seconds so that a bridged wire is formed.

When the thus-manufactured connection cord 1 is used to establish the connection with the discharge lamp, the outer sheath 5 made of the rubber composition containing tetrafluoroethylene-α-olefin copolymer as the main component cannot be degenerated even if elements for forming the lamp for a vehicle are heated to 120° C. to 125° C. attributable to heat generated by the discharge lamp or sunlight. Moreover, generation of harmful gas can be prevented so that a problem of shortening of the life of the discharge lamp occurring due to adhesion of the harmful gas to the discharge lamp is prevented. Since the connection cord 1 has softness (flexibility), the operation for attaching the discharge lamp to the lamp body can easily be performed with an excellent working efficiency.

The rubber composition containing tetrafluoroethylene-α-olefin copolymer as the main component for forming the outer sheath 5 is considered to absorb moisture if it is continuously watered for a long time. However, the inner sheath 4 formed by mixing the filler processed with the coupling agent with the rubber composition containing tetrafluoroethylene-α-olefin copolymer as the main component and having the humidity resistance is able to prevent an accident of forming of a hole in the inner sheath 4 even if the connection cord 1 is watered and the outer sheath 5 has absorbed moisture.

The connection cord 1 according to the present invention has the sheath 3 mainly constituted by the inner sheath 4 and the outer sheath 5. Since the inner sheath 4 is formed by mixing the filler processed with the coupling agent with the rubber composition containing tetrafluoroethylene-α-olefin copolymer as the main component and the outer sheath 5 is made of the rubber composition containing tetrafluoroethylene-α-olefin copolymer as the main component, the inner sheath 4 and the outer sheath 5 can satisfactorily be adhered to each other. Since the sheaths 4 and 5 contain the same main component and are manufactured by substantially the same processes, excessive enlargement of the manufacturing cost can be prevented even if the two-layer structure is employed.

A second embodiment of the present invention will now be described. A portion of reference numerals shown in FIG. 1 and put in parentheses are those according to the second embodiment.

A connection cord 1A according to a second embodiment is different from that according to the first embodiment in an inner sheath 4a which is made of soft resin having humidity, for example, a silicon rubber mixture. Therefore, the different portion will mainly be described and similar portions are given the same reference numerals and omitted from description. Since the connection cord 1A according to the second embodiment has the same shape as the connection cord 1 according to the first embodiment, the drawing (FIG. 1) showing the first embodiment is used and only reference numerals representing different portions are put in parentheses.

The inner sheath 4a may be made of fluororesin, such as tetrafluoroethylene-hexafluoropropylene copolymer (FEP), tetrafluoroethylene-perfluoroalkylvinylether copolymer (PFA) or polytetrafluoroethylene (PTFE), as well as the above-mentioned silicon rubber mixture.

Also the second embodiment has the structure such that the outer sheath 5 is made of the rubber composition containing tetrafluoroethylene-α-olefin copolymer as the main component. Therefore, even if the connection cord 1A is watered and thus the outer sheath 5 has absorbed moisture, a problem of hole forming in the inner sheath 4a can be prevented after the discharge lamp has been turned on and thus high voltage is applied to the connection cord 1A because the inner sheath 4a has the humidity resistance.

Figure 3:
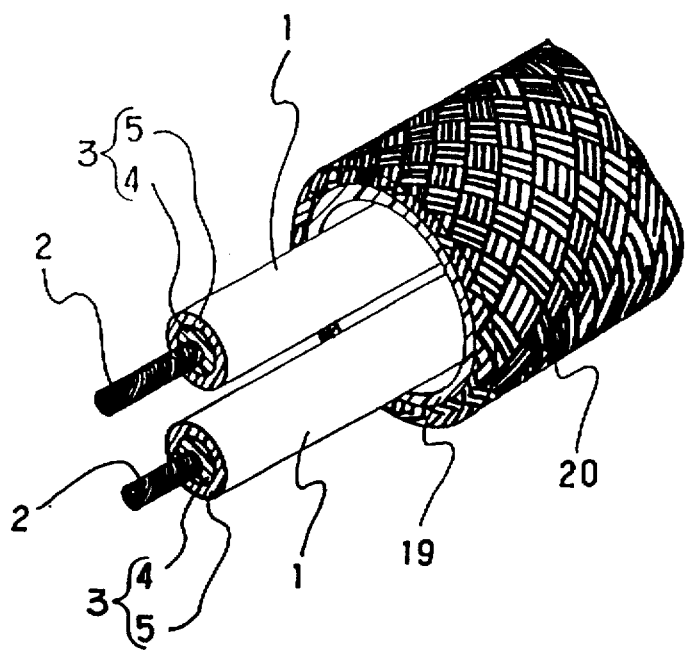
FIG. 3 is a perspective view showing the connection cord.
Figure 2:
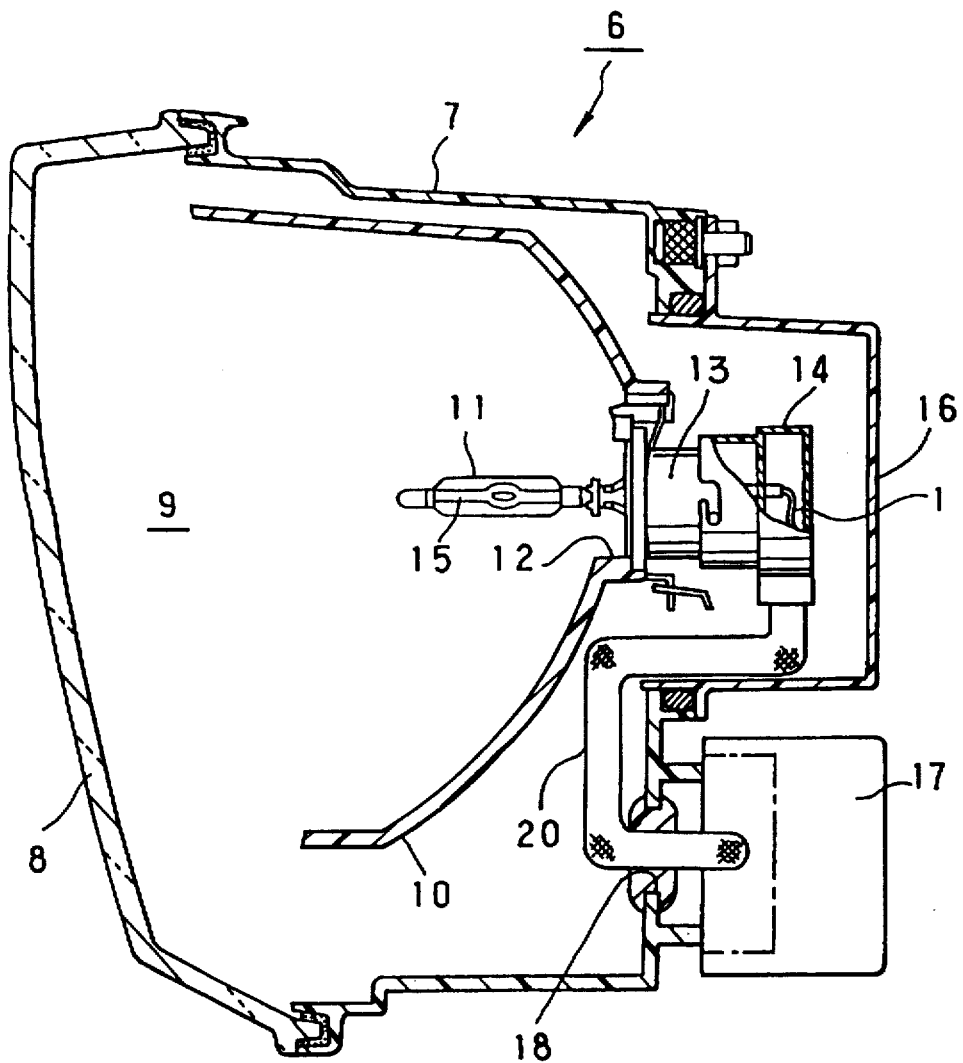
FIG. 2 is a vertical cross sectional view showing an example of a vehicular lamp according to the present invention.

FIG. 2 is a vertical cross sectional view showing an example of the lamp for a vehicle comprising the connection cord 1. FIG. 3 is a perspective view showing a state where two connection cords 1 are disposed in a space in a tube 19.

A lamp 6 for a vehicle has a lamp body 7 opened forwards (a direction in which light is emitted from the lamp is the forward direction) and made of synthetic resin; and a front lens 8 for covering an opening of the lamp body 7. A reflector 10 is disposed in a space 9 in the lamp body 7 formed by the lamp body 7 and the front lens 8. The reflecting mirror 10 is, by a means (not shown), attached to the lamp body 7.

The reflecting mirror 10 has an insertion hole 12, through which a discharge lamp 11 is inserted. Initially, a connection terminal 13 of the discharge lamp 11 is received by a main portion of a socket 14, and then a glass sphere 15 is inserted into the insertion hole 12. Then, the discharge lamp 11 is attached to the reflector 10 by an arbitrary attaching means, such as a retainer spring. As a result, the discharge lamp 11 is located in such a manner that the central axis of the glass sphere 15 runs on the main optical axis of the reflector 10.

The operation for connecting the discharge lamp 11 to the socket 14 and that for changing the discharge lamp 11 can be performed in a state where a synthetic resin cover 16 detachably attached to the rear side of the lamp body 7 has been removed.

A case 17 for accommodating a start circuit (not shown) is attached to the rear surface of the lamp body 7 at a position below the cover 16 by a means (not shown). Two connection cords 1 drawn from the case 17 are allowed to pass through an insertion hole 18 formed in the rear surface of the lamp body 7 to be introduced into the space 9 in the lamp body 7 so that the two connection cords 1 are connected to the socket 14.

The two connection cords 1 are cords for supplying electric power to the discharge lamp 11, the connection cords 1 being disposed in the space in the tube 19 made of the rubber composition containing tetrafluoroethylene-α-olefin copolymer as the main component. Moreover, the tube 19 is covered with a tube cover 20 made of a conductive metal knitted into a mesh shape (see FIG. 3).

The reason why the connection cords 1 are covered with the tube 19 is that the connection cords 1 must be protected from being heated excessively. The tube 19 is made of the rubber composition containing tetrafluoroethylene-α-olefin copolymer as the main component so that deterioration is prevented even if the tube 19 is heated considerably and generation of harmful gas is prevented. Since the flexible tube 19 is employed, the operation for attaching the tube 19 can easily be performed.

The reason why the tube 19 is covered with the tube cover 20 made of the conductive metal is that the tube 19 must be protected from being damaged and leakage of noise generated from the connection cords 1 must be prevented.

As described above, since the structure of the invention is arranged such that the outer sheath is made of the soft resin having heat resistance, the connection cord is not denatured even if it is heated to 120° C. to 125° C. Moreover, generation of harmful gas, such as siloxane gas which adheres to the discharge lamp and shortens the life of the discharge lamp, can be prevented. In addition, the assembling operation and the adhesion operation can easily be performed. Since the inner sheath is made of the soft resin having humidity resistance, the inner sheath does not absorb moisture even if the connection cord is watered and thus the outer sheath has absorbed moisture. Therefore, an accident of forming a hole in the sheath of the connection cord can be prevented even if high voltage is applied to the connection cord.

Since the structure of the invention is arranged such that the outer sheath is made of the rubber composition containing tetrafluoroethylene-α-olefin copolymer as the main component, an advantage can be realized in that generation of any harmful gas is prevented even if heated at high temperatures.

Further, the structure of the invention permits the connection cord to be disposed in a portion, such as a lamp chamber in which the discharge lamp is disposed, which is heated, the connection cord is not denatured attributable to the high temperatures, and generation of harmful gas can be prevented.

Still further, the structure of the invention enables the two connection cords to be bundled. Thus, the operation for attaching the discharge lamp to the lamp unit can easily be performed. Moreover, when the two connection cords are bent, generation of stress in the connection cord can be prevented.

Moreover, the structure of the invention enables the tube to be protected from being damaged when the discharge lamp is attached to the lamp unit or when the tube is brought into contact with another element in the lamp unit. Moreover, leakage of noise generated from the connection cord can be prevented.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A vehicular lamp comprising:
   a lamp body;
   an outer cover;
   a lamp chamber defined by said lamp body and said outer cover;
   a discharge lamp serving as a light source; and
   a connection cord connecting to said discharge lamp, said connection cord comprising at least one inner sheath made of soft resin having humidity resistance and at least one outer sheath made of soft resin having heat resistance.

2. A vehicular lamp according to claim 1, wherein said outer sheath is made of a rubber composition containing tetrafluoroethylene-α-olefin copolymer as the main component.

3. A vehicular lamp according to claim 1 or 2, wherein said inner sheath is made of soft resin manufactured by mixing a filler processed with a coupling agent with a rubber composition, the main component of which is tetrafluoroethylene-α-olefin copolymer.

4. A vehicular lamp according to claim 3, wherein said coupling agent comprises a material selected from a group consisting of a silane material, an aluminum material, a zircoaluminum material and a titanate material.

5. A vehicular lamp according to claim 1 or 2, wherein said inner sheath is made of a silicon rubber mixture.

6. A vehicular lamp according to claim 5, wherein said inner sheath is made of a material selected from a group consisting of tetrafluoroethylene-hexafluoropropylene copolymer (FEP), tetrafluoroethylene-perfluoroalkylvinylether copolymer (PFA) and polytetrafluoroethylene (PTFE).

7. A vehicular lamp according to claim 1, wherein a thickness of said inner sheath is 1.0 mm and a thickness of said outer sheath is 0.55 mm.

8. A vehicular lamp according to claim 1, wherein said discharge lamp and said connection cord are disposed within said lamp chamber.

9. A vehicular lamp according to claims 1, wherein two connection cords are provided, and said connection cords are disposed in a space in a tube made of the soft resin having the heat resistance.

10. A vehicular lamp according to claim 4, wherein said tube is covered with a tube cover made of a conductive metal material.

* * * * *